(12) United States Patent
Sotome

(10) Patent No.: US 9,634,586 B2
(45) Date of Patent: Apr. 25, 2017

(54) FAIL-SAFE APPARATUS FOR INVERTER

(71) Applicant: Mitsubishi Electric Corporation, Tokyo (JP)

(72) Inventor: Hideyuki Sotome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/638,197

(22) Filed: Mar. 4, 2015

(65) Prior Publication Data

US 2015/0280624 A1 Oct. 1, 2015

(30) Foreign Application Priority Data

Apr. 1, 2014 (JP) ................................. 2014-075108

(51) Int. Cl.
| | |
|---|---|
| G05B 11/28 | (2006.01) |
| H02P 6/12 | (2006.01) |
| H02P 6/24 | (2006.01) |
| H02M 1/32 | (2007.01) |
| H02M 7/5387 | (2007.01) |

(52) U.S. Cl.
CPC ................ H02P 6/12 (2013.01); H02M 1/32 (2013.01); H02M 7/5387 (2013.01); H02P 6/24 (2013.01)

(58) Field of Classification Search
CPC .. H02P 27/026; H02M 5/271; H02M 7/53875
USPC ................................. 318/797–802, 599, 811
See application file for complete search history.

(56) References Cited

U.S. PATENT DOCUMENTS

| | | | | | |
|---|---|---|---|---|---|
| 5,360,077 | A  * | 11/1994 | Nishimoto | ........... | B62D 5/0493 180/446 |
| 6,988,027 | B2 * | 1/2006 | Yuda | .................... | B62D 5/0493 180/402 |
| 7,652,858 | B2 * | 1/2010 | Tang | .................... | H02H 7/0838 361/18 |
| 8,605,471 | B2 * | 12/2013 | Ogura | ..................... | H02M 1/32 363/56.03 |

(Continued)

FOREIGN PATENT DOCUMENTS

| | | |
|---|---|---|
| JP | 2011-172343 A | 9/2011 |
| JP | 2011217479 A | 10/2011 |
| JP | 2014023180 A | 2/2014 |

OTHER PUBLICATIONS

Communication dated Feb. 3, 2015, issued by the Japan Patent Office in corresponding application No. 2014-075108.

*Primary Examiner* — Rina Duda
(74) *Attorney, Agent, or Firm* — Sughrue Mion, PLLC; Richard C. Turner

(57) ABSTRACT

There is provided a fail-safe apparatus for an inverter that can suppress the voltage of a DC power source from rising when the voltage of the DC power source becomes excessive, due to an abnormality caused in an inverter that performs driving and electric-power generation by use of a synchronous motor in which a permanent magnet is utilized as a magnetic-field magnet. The fail-safe apparatus for the inverter includes an excessive voltage detection circuit for detecting a state of excessive voltage while monitoring the voltage of the DC power source of the inverter and a drive switching circuit for switching a driving method for a semiconductor switching device between three-phase PWM driving and three-phase short-circuiting driving in accordance with the state of an excessive voltage detection circuit.

9 Claims, 5 Drawing Sheets

(56) References Cited

U.S. PATENT DOCUMENTS

| | | | | |
|---|---|---|---|---|
| 2006/0245222 A1* | 11/2006 | Nojima | ............... | H02M 1/32 |
| | | | | 363/132 |
| 2008/0007190 A1* | 1/2008 | Kunii | ............... | B60L 11/08 |
| | | | | 318/141 |
| 2012/0050922 A1* | 3/2012 | Yamai | ............... | G01R 31/02 |
| | | | | 361/31 |
| 2012/0293095 A1* | 11/2012 | Imura | ............... | H02P 27/08 |
| | | | | 318/139 |

* cited by examiner

| INPUTS | | OUTPUTS |
|---|---|---|
| $\overline{EN}$ | A | Y |
| L | L | L |
| L | H | H |
| H | X | Z |

* Z DENOTES HIGH IMPEDANCE.

| INPUTS | | | OUTPUTS | |
|---|---|---|---|---|
| $\overline{EN}$ | Y1 | Y2 | 5uo | 5uo* |
| L | L | H | L | H |
| H | H | L | PWMa | PWMa* |

FAIL-SAFE APPARATUS FOR INVERTER

BACKGROUND OF THE INVENTION

Field of the Invention

The present invention relates to a fail-safe apparatus for an inverter.

Description of the Related Art

In recent years, due to the tendency toward gasoline mileage regulation on automobiles, a mild-hybrid automobile and the like have been put to practical use; For example, a synchronous motor equipped with an inverter is utilized in such a hybrid automobile. In addition, due to a demand for a high-power motor and the like, a system utilizing a new DC power source such as a 48-V battery or a 48-V lithium ion battery has been drawing attention, in comparison with a system utilizing 12-V battery DC power source. The foregoing synchronous motor includes a synchronous motor that utilizes a permanent magnet for producing a magnetic field and operates at a high rotation speed. While such a synchronous motor equipped with a permanent magnet does not require any excitation current, the induction voltage produced by the permanent-magnet magnetic field increases in proportion to the rotation speed. Due to this phenomenon, when the rotation speed of the motor becomes so high as to exceed a given value, the produced induction voltage exceeds the output voltage of the inverter; therefore, in the control implemented at a time when the motor rotates at a high speed, there is utilized a method in which the output voltage of the inverter is suppressed by use of weak-magnetic-field control or the like utilizing PWM (Pulse Width Modulation)-control.

The foregoing method is applied also to the case where electric power is generated by use of a synchronous motor equipped with a magnetic-field permanent magnet; because when the rotation speed of the motor becomes so high as to exceed a given value, the produced induction voltage exceeds the DC power source voltage of the inverter, there is utilized a method in which weak-magnetic-field control utilizing PWM-control is implemented even at a time when electric power is generated so that the generated voltage is suppressed from exceeding the upper limit value of the restricted voltage.

However, in the case of such a motor, as described above, that utilizes a permanent magnet for producing a magnetic field and operates at a high rotation speed, when an abnormality occurs in the inverter at a time when the motor rotates at a high rotation speed, the induction voltage produced by the rotation of the motor becomes excessively high; thus, the excessively high voltage may break the inverter; in addition, for example, in the case of a 48-V system, the induction voltage exceeds the upper limit voltage of the DC power source and hence the voltage may increase up to a value that is so high as to provide danger to a human body.

Accordingly, as a suppression method at a time when an abnormality occurs in the inverter and hence the induction voltage of the motor produces an excessive voltage, there has been proposed a configuration in which when the inverter is shut off, the inverter is controlled so as to be in a three-phase short-circuiting mode (refer to Patent Document 1).

[Patent Document 1] Japanese Patent Application Laid-Open No. 2011-172343

Use of the configuration disclosed in Patent Document 1 makes it possible that when due to an abnormality in the inverter, the inverter is shut off and the voltage produced by the induction voltage of the motor becomes the same as or higher than a predetermined voltage, the inverter is made to be in the three-phase short-circuiting mode so that the voltage can be suppressed from becoming excessively high. However, in the case of the foregoing configuration, the inverter cannot be controlled to be in the three-phase short-circuiting mode for the excessive voltage that is produced when the terminal of the motor to be connected with a DC power source is disconnected at a time when the motor is rotating at a high rotation speed and weak control is required or that is produced through a contributing factor other than the shutoff of the inverter, such as a failure in a sensor.

SUMMARY OF THE INVENTION

A fail-safe apparatus for an inverter according to the present invention is to solve the foregoing problems, and is provided with an excessive voltage detection circuit for detecting a state of excessive voltage while monitoring the DC power source voltage of an inverter and with a drive switching circuit for switching a semiconductor switching device, which performs electric-power conversion, to three-phase PWM driving or to three-phase short-circuiting driving in accordance with the state of the excessive voltage detection circuit.

In the present invention, although a motor is PWM-driven at normal time, a three-phase switching device is switched from PWM driving to three-phase short-circuiting driving when some sort of abnormality occurs in an inverter; thus, because it is made possible to suppress the DC power source voltage from exceeding a predetermined voltage range, a high-safety fail-safe apparatus for an inverter can be obtained.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
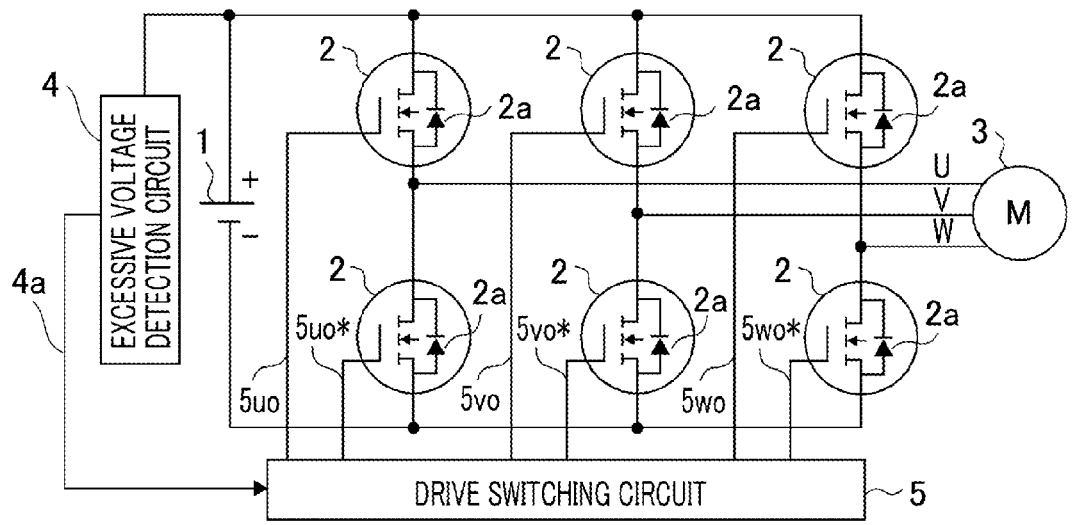
FIG. 1 is a schematic configuration diagram illustrating a fail-safe apparatus for an inverter according to Embodiment 1 of the present invention.

FIG. 1 illustrates an example of a fail-safe apparatus according for an inverter to Embodiment 1 of the present invention. This inverter has a switching circuit configured with a semiconductor switching device 2 such as an IGBT (Insulated Gate Bipolar Transistor) or a MOSFET (Metal Oxide Semiconductor Field Effect Transistor), performs PWM drive of a DC voltage supplied from a DC power source 1, by use of the semiconductor switching device 2, and converts the DC voltage into a three-phase AC voltage so as to drive a synchronous motor (referred to also as a motor, hereinafter) 3.

For example, the motor 3 is directly connected with an engine or is belt-connected with an engine through a pulley or the like. In the case where the motor 3 is rotated by the engine, the inverter can be operated as an electric power generator; when the induction voltage of the motor 3 is larger than the DC power source voltage of the inverter, PWM drive utilizing the rectification action of a reflux diode 2a in the semiconductor switching device 2 or weak-magnetic-field control is applied to the three-phase AC voltage so as to generate electric power; when the induction voltage of the motor 3 is smaller than the DC power source voltage of the inverter, the inverter is made to operate as a boosting converter, by use of the semiconductor switching device 2, so that electric power is generated.

In addition, the fail-safe apparatus for the inverter has a drive switching circuit 5 for switching the driving method for the semiconductor switching device 2 between PWM driving and three-phase short-circuiting driving, in accordance with the output signal of an excessive voltage detection circuit 4 that detects the voltage state of the DC power source 1.

The excessive voltage detection circuit 4 is formed of a circuit that compares a threshold voltage for specifying an excessive voltage with a detection voltage detected at the DC power source 1, by use of a comparator or the like, and outputs a "H" signal or a "L" signal. In Embodiment 1, an excessive voltage determination signal 4a is defined in such a way as to be "L" when the excessive voltage detection circuit 4 performs detection of an excessive voltage.

Next, one-phase (U-phase) operation of the drive switching circuit 5 in the fail-safe apparatus for the inverter according to Embodiment 1 will be explained based on FIG. 2. The explanation also applies to each of operations of the other phases (V-phase and W-phase).

Figure 2:
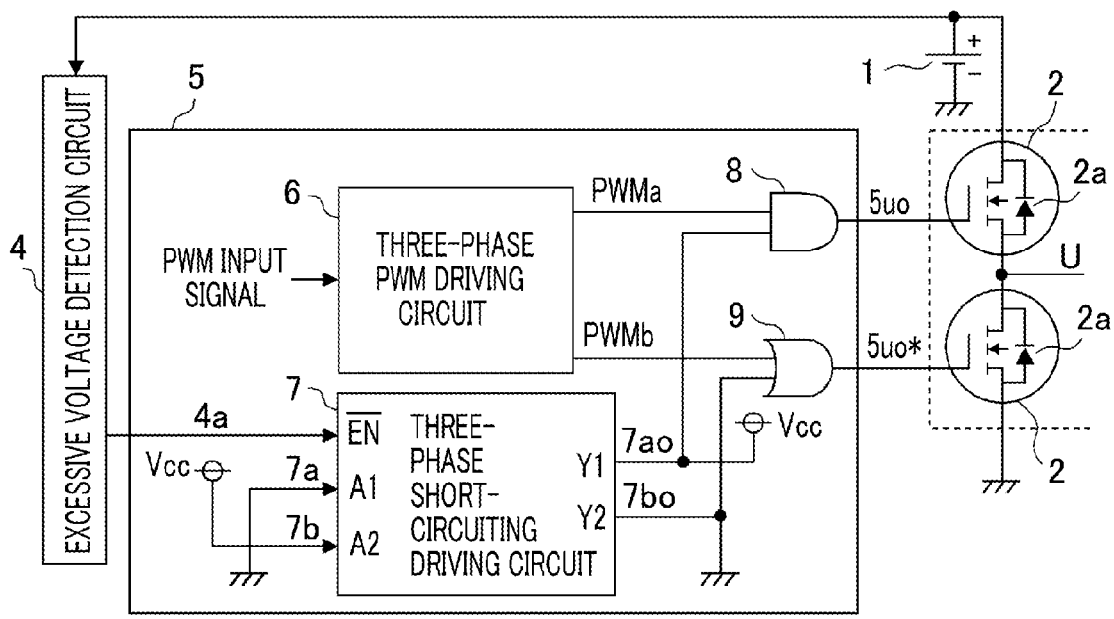
FIG. 2 is a schematic configuration diagram illustrating part (U-phase) of a drive switching circuit in the fail-safe apparatus for the inverter according to Embodiment 1 of the present invention.

As illustrated in FIG. 2, the drive switching circuit 5 is configured with a three-phase PWM driving circuit 6, a three-phase short-circuiting driving circuit 7, an AND circuit 8, and an OR circuit 9. The respective outputs of the three-phase PWM driving circuit 6 and the three-phase short-circuiting driving circuit 7 are connected with the upper arm of the semiconductor switching device 2 by way of the AND circuit 8, which is a logic circuit, and with the lower arm of the semiconductor switching device 2 by way of the OR circuit 9, which is a logic circuit. Normally, the output signal of the three-phase PWM driving circuit 6 to which a PWM input signal is inputted PWM-drives the switching device 2.

As illustrated in FIG. 2, as its inputs, the three-phase short-circuiting driving circuit 7 has $\overline{EN}$ to which the excessive voltage determination signal 4a is inputted and A1 and A2 to which input signals 7a and 7b, respectively, are inputted; as its outputs, the three-phase short-circuiting driving circuit has Y1 and Y2 from which output signals 7ao and 7bo, respectively, are outputted. In this situation, the three-phase short-circuiting driving circuit 7 is configured in such a way that in accordance with a logic table represented in FIG. 3, its output Y is outputted based on the input $\overline{EN}$ to which the excessive voltage determination signal 4a is given and an input A. Each of the inputs A1 and A2 in FIG. 2 corresponds to the input A in FIG. 3; each of Y1 and Y2 in FIG. 2 corresponds to the output Y in FIG. 3. When an excessive voltage is detected, the input signals 7a and 7b are set to "L" and "H", respectively, so that the output signals 7ao and 7bo, which are the outputs of the three-phase short-circuiting driving circuit 7, become "L" and "H", respectively. In contrast, when the excessive voltage determination signal 4a is "H", the output Y becomes high-impedance; thus, in order to prevent the logics of the output signals 7ao and 7bo from becoming unstable, the output signal 7ao is pulled up to the power source, and the output signal 7bo is pulled down to the ground. As the three-phase short-circuiting driving circuit 7, a buffer IC or the like is utilized. As described above, the output of the three-phase short-circuiting driving circuit 7 becomes high-impedance or becomes the same signal as the input signal.

Figures 3, 4, 5:
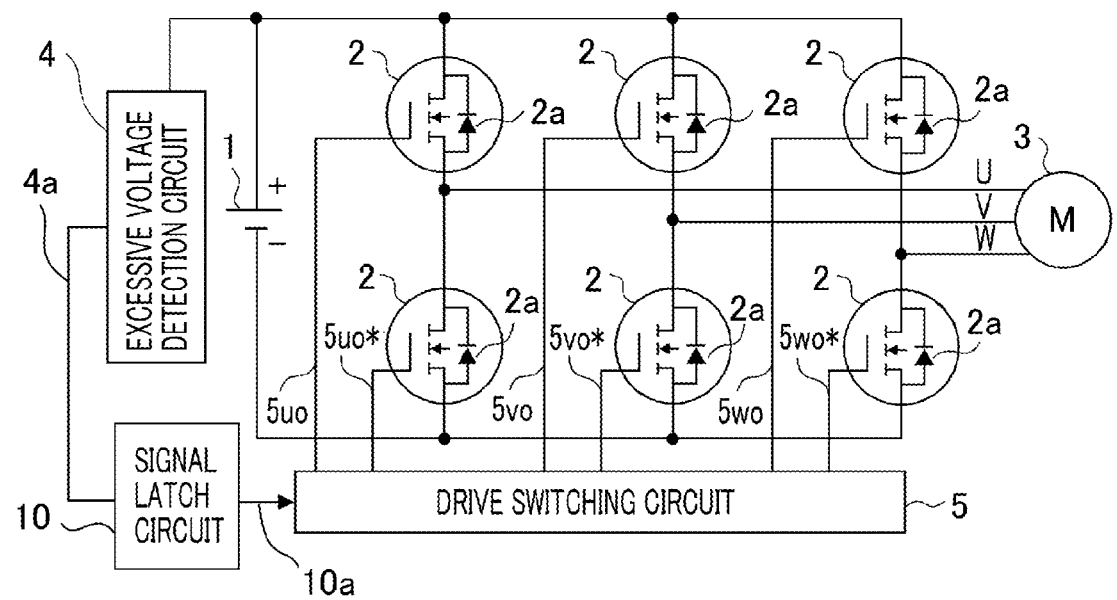
FIG. 3 is a logic table at the input and the output of a three-phase short-circuiting driving circuit in the fail-safe apparatus for the inverter according to Embodiment 1 of the present invention.
FIG. 4 is a logic table at the input and the output of the drive switching circuit in the fail-safe apparatus for the inverter according to Embodiment 1 of the present invention.
FIG. 5 is a schematic configuration diagram illustrating a fail-safe apparatus for an inverter according to Embodiment 2 of the present invention.

When the drive switching circuit 5 configured as described above is utilized, signals 5uo and 5uo* to be outputted to the semiconductor switching device 2 are configured so as to be outputted in such a manner as represented by a logic table in FIG. 4. That is to say, in the case where the voltage of the DC power source 1 is normal, the excessive voltage determination signal 4a at the input $\overline{EN}$, the output signal 7ao at the output Y1, and the output signal 7bo at the output Y2 become "H", "H", and "L", respectively so that the output signal 5uo of the AND circuit 8 and the output signal 5uo* of the OR circuit 9 perform three-phase PWM drive of the semiconductor switching device 2; in the case where the voltage of the DC power source 1 exceeds the upper limit of the specified voltage and the excessive voltage detection circuit 4 detects an excessive voltage, the excessive voltage determination signal 4a at the input $\overline{EN}$, the output signal 7ao at the output Y1, and the output signal 7bo at the output Y2 become "L", and "H", respectively and hence the output signal 5uo of the AND circuit 8 and the output signal 5uo* of the OR circuit 9 become "L" and "H", respectively, and perform three-phase short-circuiting driving of the semiconductor switching device 2 so as to decreases the rotation speed of the motor; thus, because it is made possible to suppress the voltage of the DC power source from exceeding the normal voltage, a high-safety fail-safe apparatus for an inverter can be obtained.

In Embodiment 1, in the case where the voltage of the DC power source 1 becomes excessive, the excessive voltage determination signal 4a from the excessive voltage detection circuit 4 is defined to be "L" so that the logics of the three-phase PWM driving circuit 6 and the three-phase short-circuiting driving circuit 7 are determined; however, there exist various modes for signal combination that demonstrates the same effect as Embodiment 1; thus, the mode is not limited to the foregoing combination.

Embodiment 2

FIG. 5 illustrates an example of a fail-safe apparatus for an inverter according to Embodiment 2 of the present invention. The same constituent elements as those in Embodiment 1 are designated by the same reference characters.

Embodiment 2 differs from Embodiment 1 in that Embodiment 2 has a signal latch circuit 10 for latching the excessive voltage determination signal 4*a* between the excessive voltage detection circuit 4 and the drive switching circuit 5.

In response to the input of an falling edge of the excessive voltage determination signal 4*a* outputted from the excessive voltage detection circuit 4, the signal latch circuit 10 latches an excessive voltage determination latch signal 10*a*, which is an output signal thereof, to "L". The excessive voltage determination latch signal 10*a* outputted from the signal latch circuit 10 is inputted to the drive switching circuit 5. In other words, the excessive voltage determination latch signal 10*a* is inputted to the input $\overline{EN}$ of the three-phase short-circuiting driving circuit The configuration of the drive switching circuit 5 is the same as the configuration in Embodiment 1, except that the excessive voltage determination signal 4*a* is replaced by the excessive voltage determination latch signal 10*a*.

Figure 6:
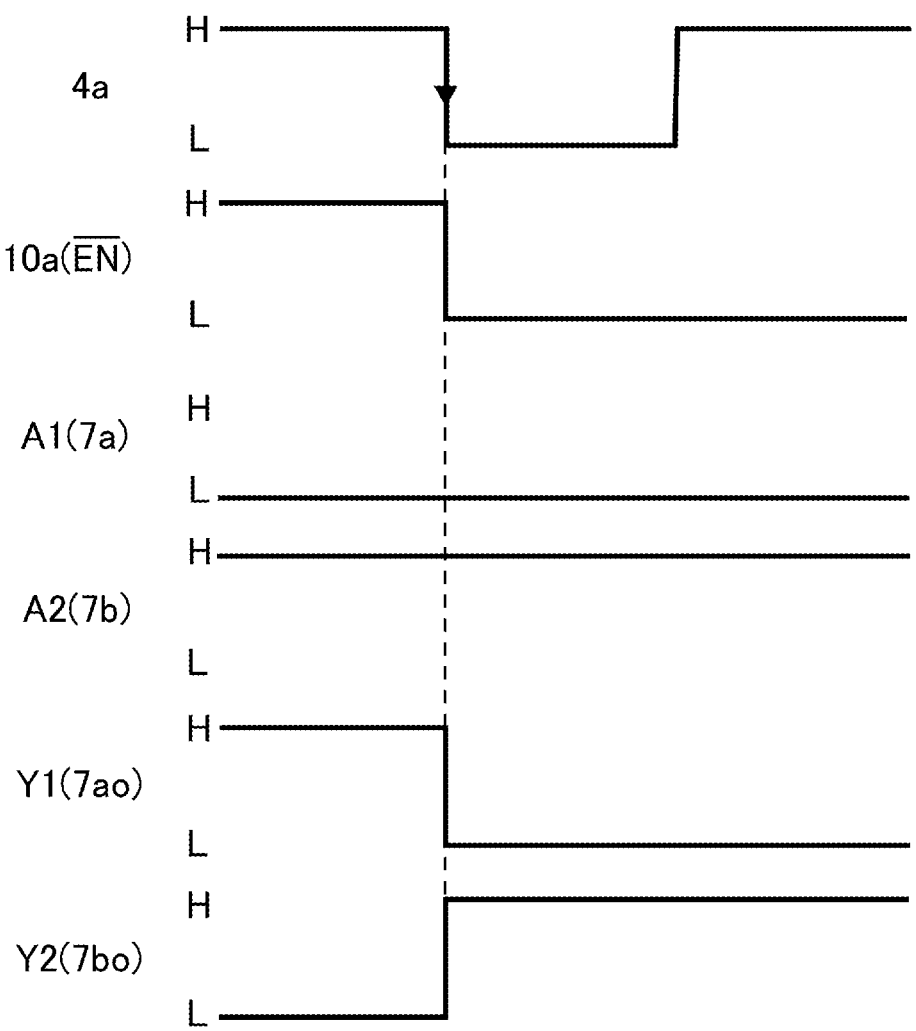
FIG. 6 is a timing chart of a latch circuit in the fail-safe apparatus for the inverter according to Embodiment 2 of the present invention.

In order to explain the foregoing operation, the timing chart at a time when an excessive voltage is detected in the configuration according to Embodiment 2 is represented in FIG. 6. Once the excessive voltage detection circuit 4 detects an excessive voltage, the semiconductor switching device 2 is driven in a three-phase short-circuiting manner, based on the logic tables in FIGS. 3 and 4. After that, even when the voltage of the DC power source 1 moves to a normal voltage, the semiconductor switching device 2 can be maintained in the three-phase short-circuiting mode.

That is to say, when the excessive voltage determination signal 4*a* becomes "L", the signal latch circuit 10 latches the excessive voltage determination latch signal 10*a* to in "L" in response to a fall of the excessive voltage determination signal 4*a*, as represented in FIG. 6. With regard to the drive switching circuit 5, the input signals 7*a* at the input A1 and the input signal 7*b* at the input A2 are "L" and "H", respectively; based on the logic table in FIG. 3, the output signal 7*ao* from the output Y1 and the output signal 7*bo* from the output Y2 are "L" and "H", respectively, as represented in FIG. 6. As a result, as is the case with Embodiment 1, the three-phase short-circuiting driving is implemented based on the logic table in FIG. 4. In Embodiment 2, as long as the excessive voltage determination latch signal 10*a* is latched to "L", the three-phase short-circuiting driving is continued.

In Embodiment 2, even when the excessive voltage determination signal 4*a* fluctuates at the time when the voltage of the DC power source 1 is just below or above the vicinity of the threshold voltage of the excessive voltage detection circuit 4, the three-phase short-circuiting driving mode is maintained because the excessive voltage determination signal 4*a* inputted to the three-phase short-circuiting driving circuit 7 is being latched; therefore, a higher-safety fail-safe apparatus for an inverter can be obtained.

Embodiment 3

Figure 7:
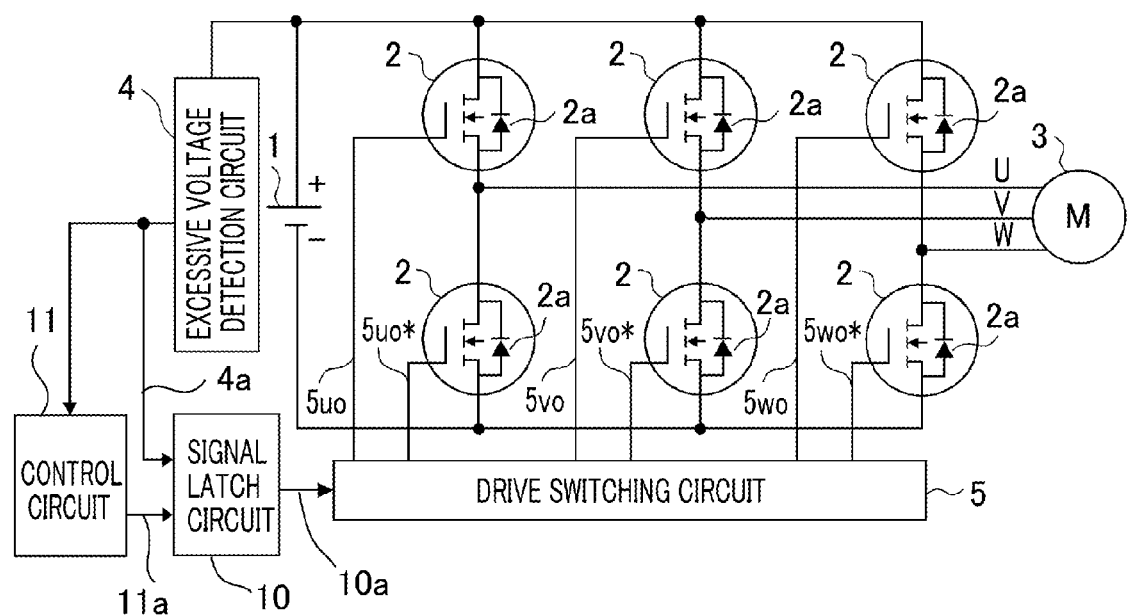
FIG. 7 is a schematic configuration diagram illustrating a fail-safe apparatus for an inverter according to Embodiment 3 of the present invention.

FIG. 7 illustrates the configuration of a fail-safe apparatus for an inverter according to Embodiment 3 of the present invention. The same constituent elements as those in Embodiment 1 are designated by the same reference characters.

Embodiment 3 differs from each of Embodiments 1 and 2 in that Embodiment 3 has a control circuit 11 for releasing a latched signal in addition to Embodiment 2. As the control circuit 11, for example, a microcomputer or the like is utilized.

Next, the operation of the fail-safe apparatus for the inverter according to Embodiment 3 of the present invention will be explained. The voltage of the DC power source 1 is detected by the excessive voltage detection circuit 4; then, the excessive voltage determination signal 4*a* outputted by the excessive voltage detection circuit 4 is inputted to the signal latch circuit 10 and the control circuit 11. Once an excessive voltage is detected and hence the excessive voltage determination signal 4*a* becomes "L", the signal latch circuit 10 latches the excessive voltage determination latch signal 10*a* to "L"; thus, the semiconductor switching device 2 is driven in a three-phase short-circuiting manner. When the transition of the voltage of the DC power source 1 is normally made, the excessive voltage determination signal 4*a* becomes "H". In this situation, when there exists a demand for PWM driving and the excessive voltage determination signal 4*a* is "H", the control circuit 11 outputs "H", as a latch release signal 11*a*, to the signal latch circuit 10. Based on the latch release signal 11*a* and the excessive voltage determination signal 4*a*, the signal latch circuit 10 makes the excessive voltage determination latch signal 10*a* change from "L" to "H" and then outputs the excessive voltage determination latch signal 10*a*.

Figure 8:
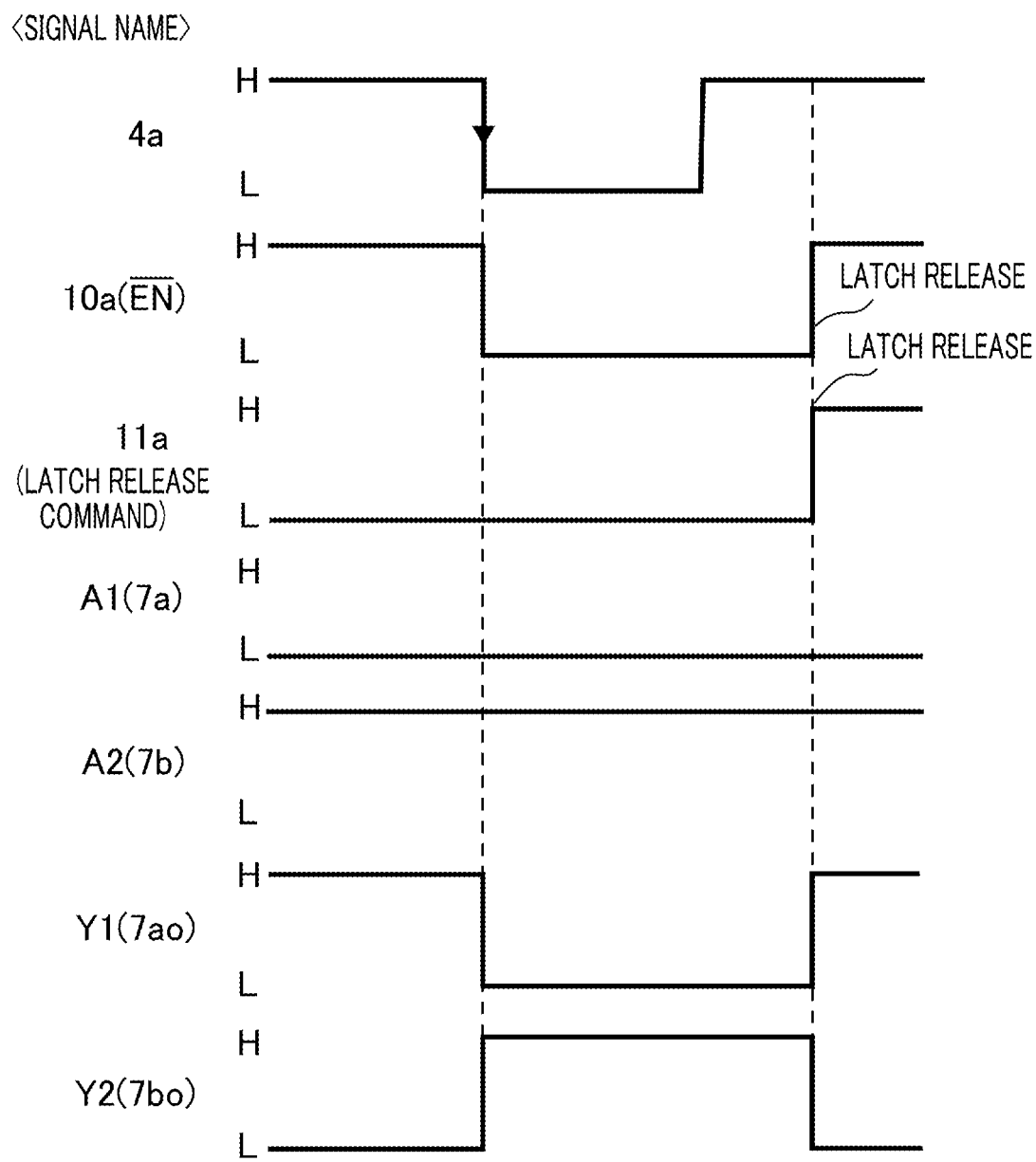
FIG. 8 is a timing chart of a latch circuit in the fail-safe apparatus for the inverter according to Embodiment 3 of the present invention.

In order to explain the foregoing operation, a timing chart in the configuration according to Embodiment 3 is represented in FIG. 8. Once the excessive voltage detection circuit 4 detects an excessive voltage, the semiconductor switching device 2 is driven in a three-phase short-circuiting manner, based on the logic tables in FIGS. 3 and 4. After that, even when the voltage of the DC power source 1 moves to a normal voltage, the semiconductor switching device 2 is maintained in the three-phase short-circuiting mode; however, when the control circuit 11 receives a demand for the PWM driving and the excessive voltage determination signal 4*a* is normal, the control circuit 11 outputs "H", as the latch release signal 11*a*, so that the excessive voltage determination latch signal 10*a* changes from "L" to "H"; thus, the driving mode for the semiconductor switching device 2 can be changed from three-phase short-circuiting driving to PWM driving.

That is to say, when the excessive voltage determination signal 4*a* becomes "L", the signal latch circuit 10 latches the excessive voltage determination latch signal 10*a* to "L" in response to a fall of the excessive voltage determination signal 4*a*, as represented in FIG. 8. With regard to the drive switching circuit 5, the input signals 7*a* at the input A1 and the input signal 7*b* at the input A2 are "L" and "H", respectively; based on the logic table in FIG. 3, the output signal 7*ao* from the output Y1 and the output signal 7*bo* from the output Y2 are "L" and "H", respectively, as represented in FIG. 8. As a result, as is the case with Embodiment 1, the three-phase short-circuiting driving is implemented based on the logic table in FIG. 4. Then, when the voltage of the DC power source 1 returns to a normal voltage, the excessive voltage determination signal 4*a* from the excessive voltage detection circuit 4 becomes "H", as represented in FIG. 8; when the control circuit 11 receives a demand for the PWM driving and the excessive voltage determination signal 4*a* is "H", the latch release signal 11*a*, as "H", is outputted. As a result, the latch is released and hence the excessive voltage determination latch signal 10*a* from the signal latch circuit 10 becomes "H", as represented in FIG. 8, and the input $\overline{EN}$ of the three-phase short-circuiting driving circuit becomes "H" concurrently, the output 7*ao* at the output Y1 and the output 7*bo* at the output Y2 become "H" and "L", respectively, which is the case where the voltage of the DC power source 1 is normal; thus, the PWM driving can be implemented based on the logic table in FIG. 4.

Embodiment 3 makes it possible that when an excessive voltage of the DC power source 1 is detected, the semiconductor switching device 2 is driven in a three-phase short-circuiting manner and hence a high-safety fail-safe apparatus for an inverter is obtained, and that when a demand for PWM driving is issued after the DC power source 1 returns to a normal state, the inverter is PWM-driven again.

Various modifications and alterations of this invention will be apparent to those skilled in the art without departing from the scope and spirit of this invention, and it should be understood that this is not limited to the illustrative embodiments set forth herein.

What is claimed is:

1. A fail-safe apparatus for an inverter that performs driving and electric-power generation by use of a synchronous motor in which a permanent magnet is utilized as a magnetic-field magnet, the fail-safe apparatus for the inverter comprising:
   a three-phase inverter circuit that has a switching device for performing electric-power conversion;
   an excessive voltage detection circuit that detects an excessive voltage by monitoring a direct current (DC) power source voltage of the inverter; and
   a drive switching circuit that switches a driving method for the switching device from a three-phase pulse width modulation (PWM) driving mode that controls an operation of the three-phase inverter based on a PWM signal to a three-phase short-circuiting driving mode that enables the three-phase inverter to be short-circuited in response to receiving an excessive voltage determination signal from the excessive voltage detection circuit,
   wherein the drive switching circuit comprises a three-phase PWM driving circuit that generates an upper-arm PWM signal and a lower-arm PWM signal, a three-phase short-circuit driving circuit that generates a first output signal and a second output signal in accordance with the excessive voltage determination signal, an AND circuit that generates an upper-arm gate control signal based on the upper-arm PWM signal and the first output signal, and an OR circuit that generates an lower-arm gate control signal based on the lower-arm PWM signal and the second output signal.

2. The fail-safe apparatus for the inverter according to claim 1, wherein the driving method for the switching device is switched between the three-phase PWM driving mode and the three-phase short-circuiting driving mode according to the first output signal and the second output signal that are output from the three-phase short-circuit driving circuit.

3. The fail-safe apparatus for the inverter according to claim 1, wherein in accordance with excessive voltage determination signal from the excessive voltage detection circuit, the three-phase short-circuiting driving circuit outputs a high impedance signal or the same signal as an input signal.

4. A fail-safe apparatus for an inverter that performs driving and electric-power generation by use of a synchronous motor in which a permanent magnet is utilized as a magnetic-field magnet, the fail-safe apparatus for the inverter comprising:
   a three-phase inverter circuit that has a switching device for performing electric-power conversion;
   an excessive voltage detection circuit that detects an excessive voltage by monitoring a direct current (DC) power source voltage of the inverter;
   a signal latch circuit for latching an excessive voltage determination signal from the excessive voltage detection circuit; and
   a drive switching circuit that switches a driving method for the switching device from a three-phase pulse width modulation (PWM) driving mode that controls an operation of the three-phase inverter based on a PWM signal to a three-phase short-circuiting driving mode that enables the three-phase inverter to be short-circuited, in response to the signal latch circuit latching the excessive voltage determination signal,
   wherein the drive switching circuit comprises a three-phase PWM driving circuit that generates an upper-arm PWM signal and a lower-arm PWM signal, a three-phase short-circuit driving circuit that generates a first output signal and a second output signal in accordance with the excessive voltage determination signal, an AND circuit that generates an upper-arm gate control signal based on the upper-arm PWM signal and the first output signal, and an OR circuit that generates an lower-arm gate control signal based on the lower-arm PWM signal and the second output signal.

5. The fail-safe apparatus for the inverter according to claim 4, wherein the driving method for the switching device is switched between the three-phase PWM driving mode and the three-phase short-circuiting driving mode according to the first output signal and the second output signal that are output from the three-phase short-circuit driving circuit.

6. The fail-safe apparatus for the inverter according to claim 4, wherein in accordance with the excessive voltage determination signal from the excessive voltage detection circuit, the three-phase short-circuiting driving circuit outputs a high impedance signal or the same signal as an input signal.

7. A fail-safe apparatus for an inverter that performs driving and electric-power generation by use of a synchronous motor in which a permanent magnet is utilized as a magnetic-field magnet, the fail-safe apparatus for the inverter comprising:
   a three-phase inverter circuit that has a switching device for performing electric-power conversion;
   an excessive voltage detection circuit that detects an excessive voltage by monitoring a direct current (DC) power source voltage of the inverter;
   a signal latch circuit for latching an excessive voltage determination signal from the excessive voltage detection circuit;
   a drive switching circuit that switches a driving method for the switching device from a three-phase pulse width modulation (PWM) driving mode that controls an operation of the three-phase inverter based on a PWM signal to a three-phase short-circuiting driving mode that enables the three-phase inverter to be short-circuited, in response to the signal latch circuit latching the excessive determination signal; and
   a control circuit that transmits a latch release command to the signal latch circuit,
   wherein the drive switching circuit comprises a three-phase PWM driving circuit that generates an upper-arm PWM signal and a lower-arm PWM signal, a three-phase short-circuit driving circuit that generates a first output signal and a second output signal in accordance with the excessive voltage determination signal, an AND circuit that generates an upper-arm gate control signal based on the upper-arm PWM signal and the first output signal, and an OR circuit that generates an lower-arm gate control signal based on the lower-arm PWM signal and the second output signal.

8. The fail-safe apparatus for the inverter according to claim 7, wherein the driving method for the switching device is switched between the three-phase PWM driving mode and the three-phase short-circuiting driving mode according to the first output signal and the second output signal that are output from the three-phase short-circuit driving circuit.

9. The fail-safe apparatus for the inverter according to claim 7, wherein in accordance with the excessive voltage determination signal from the excessive voltage detection circuit, the three-phase short-circuiting driving circuit outputs a high impedance signal or the same signal as an input signal.

* * * * *